(12) United States Patent
Buell et al.

(10) Patent No.: US 6,601,667 B2
(45) Date of Patent: Aug. 5, 2003

(54) MOTORCYCLE ENGINE COOLING SYSTEM

(75) Inventors: Erik F. Buell, Mukwonago, WI (US); Todd R. Wightman, Waukesha, WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/902,458

(22) Filed: Jul. 10, 2001

(65) Prior Publication Data

US 2003/0010558 A1 Jan. 16, 2003

(51) Int. Cl.[7] ............................................... B60K 11/04
(52) U.S. Cl. ....................................... 180/229; 180/68.1
(58) Field of Search ................................ 180/229, 219, 180/68.1, 228, 68.2

(56) References Cited

U.S. PATENT DOCUMENTS

| | | | | |
|---|---|---|---|---|
| 3,894,521 A | * | 7/1975 | Sakasegawa et al. | 123/41.12 |
| 4,577,720 A | * | 3/1986 | Hamane et al. | 180/229 |
| 4,618,019 A | * | 10/1986 | Ando et al. | 180/219 |
| 4,735,278 A | * | 4/1988 | Komuro et al. | 180/229 |
| 5,152,361 A | * | 10/1992 | Hasegawa et al. | 180/230 |
| 5,915,344 A | * | 6/1999 | Suzuki et al. | 123/41.11 |
| 5,992,554 A | * | 11/1999 | Hasumi et al. | 180/229 |
| 6,382,169 B1 | * | 5/2002 | Gausman | 123/195 R |

* cited by examiner

*Primary Examiner*—Avraham Lerner
(74) *Attorney, Agent, or Firm*—Michael Best & Friedrich LLP

(57) ABSTRACT

A motorcycle that includes a frame, a steering assembly, front and rear wheels, and an engine/transmission assembly. The motorcycle also includes an engine cooling fan that creates a flow of cooling air across the engine. The motorcycle also includes an air box and an air box delivery system that provides air to the air box. The air box is mounted to the frame and includes an air filter, an inlet located outside of the filter, and an outlet located inside of the filter such that air entering the inlet passes through the filter before exiting through the outlet. The air box delivery system includes a passage that is substantially perpendicular to a longitudinal axis of the frame and in fluid flow communication with the air box, the passage directing the flow of air upwardly into the air box.

20 Claims, 3 Drawing Sheets

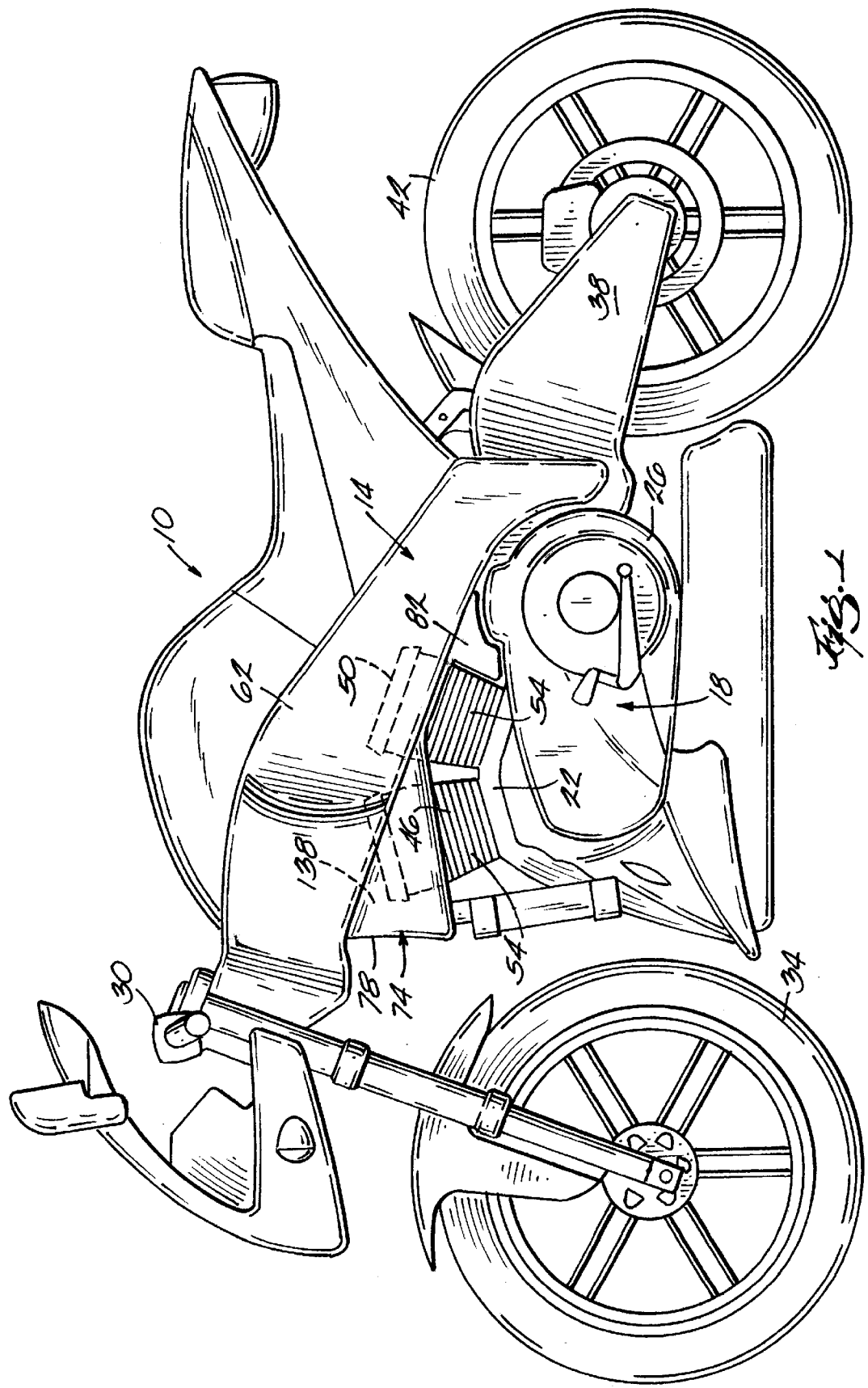

MOTORCYCLE ENGINE COOLING SYSTEM

The invention relates to cooling systems for motorcycle engines. More particularly, the invention relates to air cooling systems for motorcycle engines.

BACKGROUND

Motorcycle engines are typically either air cooled or water cooled. Air cooled engines rely on a flow of air over heat transfer surfaces such as fins to cool the engine. Water cooled engines use a flow of coolant within the engine to carry heat from the engine, and use a heat exchanger, such as a radiator, to transfer the heat to the air. The present invention relates to air cooled motorcycle engines.

The higher the volume of air flowing over an air cooled motorcycle engine, the more effective the cooling fins are at transferring heat from the engine to the air. The fins are therefore less effective when the motorcycle is operated at low speeds or when the motorcycle is not moving at all. Under these conditions, the temperature of the engine can substantially increase. Inadequate cooling of motorcycle engines may cause discomfort to a motorcycle rider due to the proximity of the rider's legs to the engine, may lead to inefficiencies in engine operation, and may decrease the service life of the engine.

SUMMARY

The present invention provides a motorcycle that includes a frame, a steering assembly, front and rear wheels, and an engine/transmission assembly. The steering assembly is mounted to a front portion of the frame and pivotable with respect to the frame to steer the motorcycle. The front wheel is rotatably mounted to the steering assembly and supports a front portion of the motorcycle. The rear wheel is rotatably interconnected with a rear portion of the frame and supports a rear portion of the motorcycle. The engine/transmission assembly includes an air cooled engine and a transmission interconnected with each other and supported by the frame. The transmission is interconnected with the rear wheel and rotates the rear wheel in response to the operation of the engine. The motorcycle also includes an engine cooling fan that creates a flow of cooling air across the engine.

The present invention also provides a method for cooling an engine on a motorcycle. The method includes providing a frame, a steering assembly, front and rear wheels, and an engine/transmission assembly. The method also includes creating a flow of cooling air across the engine with an engine cooling fan.

The present invention provides a motorcycle that includes a frame, a steering assembly, front and rear wheels, and an engine/transmission assembly. The motorcycle also includes an air box and an air box delivery system that provides air to the air box. The air box is mounted to the frame and includes an air filter, an inlet located outside of the filter, and an outlet located inside of the filter such that air entering the inlet passes through the filter before exiting through the outlet. The air box delivery system includes a passage that is substantially perpendicular to a longitudinal axis of the frame and in fluid flow communication with the air box, the passage directing the flow of air upwardly into the air box.

Other features and advantages of the invention will become apparent to those skilled in the art upon review of the following detailed description, claims, and drawings.

BRIEF DESCRIPTION OF THE DRAWINGS

FIG. 1 is a side view of a motorcycle embodying the present invention.

FIG. 5 is a cross-sectional view taken along line 5—5 in FIG. 4.

Figure 3:
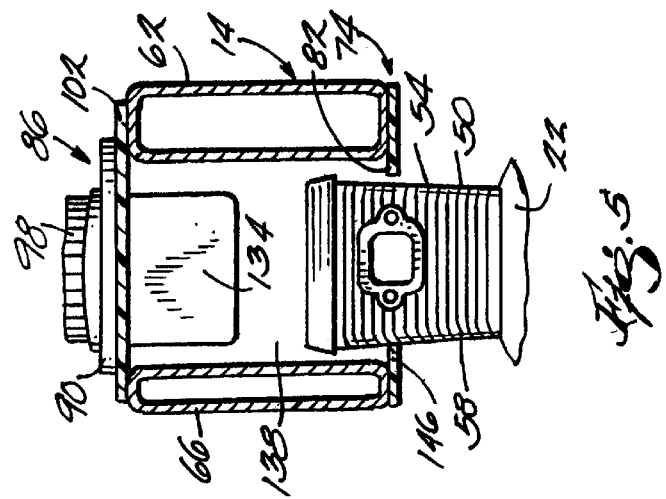
FIG. 3 is a cross-sectional view taken along line 3—3 in FIG. 2.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

FIG. 1 illustrates a motorcycle 10 that includes a frame 14 and an engine/transmission assembly 18 connected to the frame 14. The engine/transmission assembly 18 includes an engine 22 and a transmission 26 connected to the engine 22. The engine 22 and the transmission 26 of the engine/transmission assembly 18 could either include a single integral housing or separate housings connected together. The motorcycle 10 also includes a steering assembly 30 mounted to the front of the frame 14, a front wheel 34 rotatably mounted to the steering assembly 30 and supporting the front end of the motorcycle 10, a swingarm 38 pivotally interconnected to the transmission 26, and a rear wheel 42 rotatably mounted to the swingarm 38. A drive member, such as a chain or drive belt (not shown) interconnects the rear wheel 42 with an output shaft (not shown) of the transmission 26.

The engine 22 is a V-twin style engine, having a front cylinder 46 and a rear cylinder 50. The cylinders 46, 50 of the engine 22 include left side surfaces 54 as seen in FIG. 1 and right side surfaces 58 shown in FIGS. 4 and 5. The rear cylinder 50 is disposed behind the front cylinder 46 with respect the direction of travel of the motorcycle 10. Upper portions of the left and right side surfaces 54, 58 of the cylinders 46, 50 are substantially covered by left and right portions 62, 66 of the frame 14, respectively. The left and right portions 62, 66 of the frame 14 are located on opposing sides of a longitudinal axis 70 of the frame 14.

Figure 4:
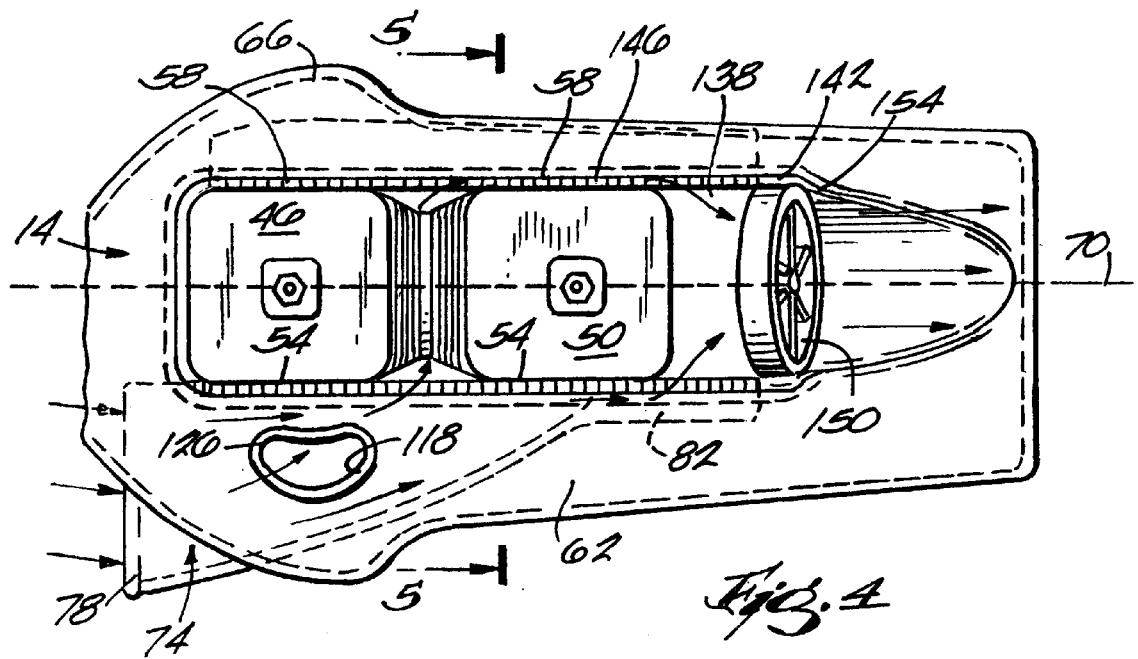
FIG. 4 is a cross-sectional view taken along line 4—4 in FIG. 3.
Figure 3:
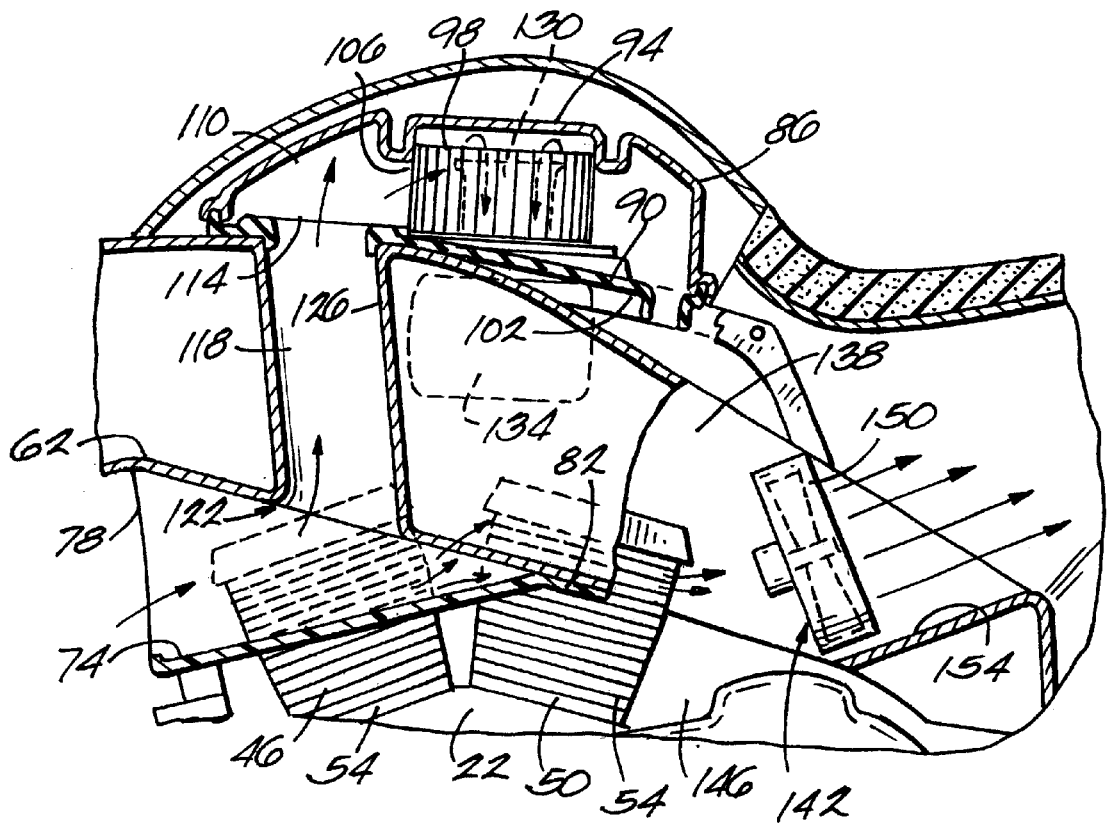

The motorcycle 10 also includes a horizontally oriented air scoop 74 that provides air to the front and rear cylinders 46, 50 to cool the engine 22. The air scoop 74 includes a forwardly opening portion 78 that receives the air from the surrounding atmosphere. The forwardly opening portion 78 is cylindrically shaped and is positioned adjacent to the left side surface of the front cylinder 46. The air scoop 74 also includes a shrouding portion 82 that directs the air received by the air scoop 74 toward the left side surfaces 54 of the engine 22 to cool the engine 22 as seen in FIGS. 3–5. The shrouding portion 82 is connected to the lower edge of the left portion 62 of the frame 14 and extends toward the cylinders 46, 50 of the engine 22 to substantially cover the gaps between the frame 14 and the engine/transmission assembly 18. The direction of the motorcycle 10 in FIG. 1 is to the left, and movement of the motorcycle 10 in the forward direction increases the head pressure of the air at the forwardly opening portion 78 of the air scoop 74 to cause the air to flow in through the air scoop 74 and across the engine 22.

Figure 2:
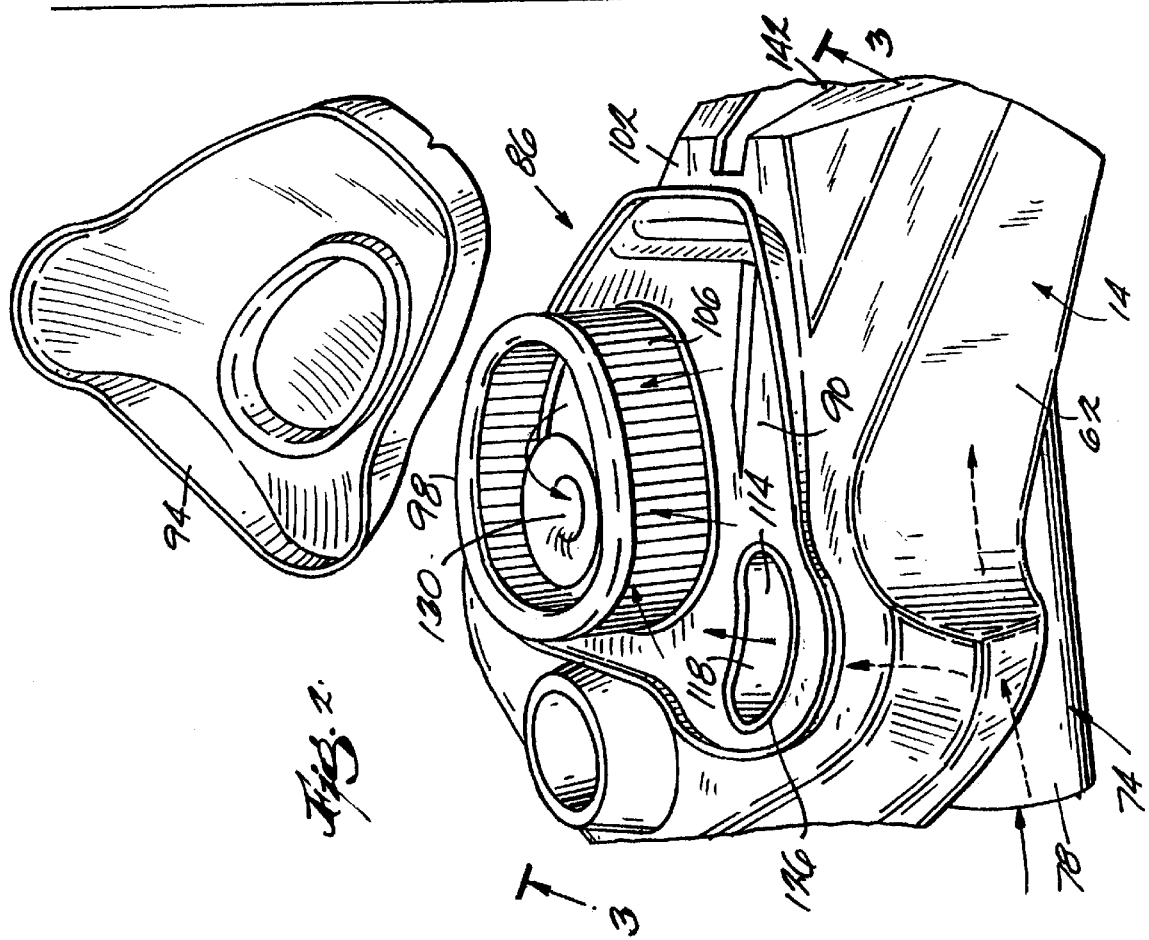
FIG. 2 is an exploded view of an air box of the motorcycle shown in FIG. 1.

FIGS. 2 and 3 illustrate an air box 86 that filters air before the air is mixed with fuel for combustion inside of the cylinders 46, 50. The air box 86 includes a base 90, a cover 94, and an air filter 98. The base 90 is mounted on top of the frame 14 to an air box support 102 and substantially covers the cylinders 46, 50 of the engine 22. The air filter 98 is cylindrically shaped and is positioned on top of and near the center of the base 90. A wall 106 of the filter 98 is made from air permeable material and separates contaminates from the air that flows through the wall 106 of the filter 98. The cover 94 connects with the base 90 to provide a hollow cavity 110 and with the air filter 98 such that air on the outside of the air filter 98 is substantially restricted from entering the inside of the air filter 98 except through the wall 106 of the filter 98.

The base 90 includes an inlet 114 that is located outside of the filter 98 and provides air to the air box 86 from the air scoop 74. The inlet 114 is in fluid flow communication with the air scoop 74 through a passage 118. The passage 118 extends generally perpendicular to the longitudinal axis 70 of the frame 14 and through the left portion 62 of the frame 14. The passage 118 is substantially vertically oriented to prevent rainwater from entering into the air box 86. The lower portion 122 of the passage 118 is angled upward relative to horizontal to assist in directing air flow from the air scoop 74 into the passage 118. The passage 118 includes a removable resilient sleeve 126 that is inserted within the passage 118 to reduce the noise that is caused by the air passing through the passage 118 at a high velocity.

The air box 86 includes an outlet 130 that is located on the inside of the filter 98 and directs filtered air downward through the base 90 and into an air manifold 134. The outlet 130 also extends generally perpendicular to the longitudinal axis 70 of the frame 14 such that the passage 118 and the outlet 130 are both vertically oriented. The air manifold 134 separates the air flow and supplies air to each combustion chamber (not shown) of the cylinders 46, 50.

As best shown in FIGS. 3–5, the left and right portions 62, 66 of the frame 14, the air scoop 74, and the base 90 of the air box 86 define a cooling air duct 138 that substantially encloses the upper portion of the engine 22. By way of this configuration, air is received from the forwardly opening portion 78 of the air scoop 74, directed across the portion of the engine 22 that is enclosed within the air duct 138, and exhausted through an exhaust port 142 that is located behind the cylinders 46, 50 of the engine 22. The motorcycle 10 also includes a right shroud 146 that is connected to the lower edge of the right portion 66 of the frame 14 and extends toward the engine 22 to cover the gaps between the frame 14 and the engine/transmission assembly 18. The shrouding portion 82 of the air scoop 74 and the right shroud 146 substantially prevent air from short circuiting into the air duct from anywhere along the air duct 138 such that substantially all of the air that is exhausted from the exhaust port 142 enters the air duct 138 from the air scoop 74 and moves through the entire length of the air duct 138 to cool the engine 22.

The motorcycle 10 also includes an engine cooling fan 150 that creates a flow of cooling air across the engine 22.

The fan 150 is positioned in the exhaust port 142 of the air duct 138 and mounted to an integral fan support portion 154 of the frame 14 behind the cylinders 46, 50 of the engine 22. The fan 150 is electrically connected to a motorcycle battery (not shown) and rotates to generate an air flow through the air duct 138 to cool the engine 22. Specifically, the fan 150 generates a low pressure zone ahead of the fan 150 such that higher pressure air at the forwardly opening portion 78 of the air scoop 74 flows across the engine 22 toward the low pressure zone ahead of the fan 150.

The fan 150 is operable at various speeds and is controlled by a thermostat. The thermostat operates to rotate the fan 150 at a first speed when the temperature of the engine 22 is within a first range, and rotate the fan 150 at a second higher speed when the temperature of the engine 22 is at a higher temperature. The thermostat includes a thermometer (not shown) that is mounted to the engine 22 to measure the temperature of the engine 22. The thermostat and fan 150 are operable after an ignition of the motorcycle 10 is turned off. Therefore, if the engine 22 is within the first or second range when the ignition is turned off, then the thermostat will continue to rotate the fan 150 until the engine 22 has sufficiently cooled to a desired temperature.

FIGS. 3 and 4 best illustrate the flow pattern of the air that flows into the air scoop 74. The air flows into the forward opening portion 78 of the air scoop 74 in response to the forward head pressure developed by riding the motorcycle 10, the low pressure zone created by rotation of the engine cooling fan 150, or a combination of the two. If the engine 22 is running, a portion of the air flow in the air scoop 74 is diverted upwardly into the air box 86 through the passage 118. The diverted air then flows through the air filter 98 and downwardly into the air manifold 134 and into the combustion chambers of the cylinders 46, 50.

The remaining air flow in the air scoop 74 is initially directed across the left side surface of the front cylinder 46 to absorb the heat and lower the temperature of the engine 22. The air flow is again split such that some of the air flows along the left side surface of the rear cylinder 50 and some of the air flows in a transverse direction between the front and rear cylinders 46, 50. The air that flows between the cylinders 46, 50 in then redirected to flow across the right side surface of the rear cylinder 50. The air flowing on the side surfaces 54, 58 of the rear cylinder 50 are combined behind the rear cylinder 50 and moved through the fan 150 in the exhaust port 142. From the exhaust port 142, the air is dispersed above the rear wheel 42 of the motorcycle 10 and into the surrounding atmosphere.

What is claimed is:

1. A motorcycle comprising:
    a frame;
    a steering assembly mounted to a front portion of the frame and pivotable with respect to the frame to steer the motorcycle;
    a front wheel rotately mounted to the steering assembly and supporting a front portion of the motorcycle;
    a rear wheel rotatably interconnected with a rear portion of the frame and supporting a rear portion of the motorcycle;
    an engine/transmission assembly including an air-cooled engine and a transmission interconnected with each other and supported by the frame, the transmission being interconnected with the rear wheel and operative in response to operation of the engine to drive rotation of the rear wheel;
    an engine cooling fan creating a flow of cooling air across the engine; and a cooling air duct that substantially encloses a portion of the engine, the engine cooling fan being in communication with the cooling air duct such that the flow of cooling air is moved through the cooling air duct and across the portion of the engine to cool the engine, wherein the frame includes a left portion that partially covers the left side surfaces of the engine and a right portion that partially covers the right side surfaces of the engine, wherein the cooling air duct is partially defined by the left and right portions of the frame, and wherein the cooling air duct further includes a shroud that substantially blocks the gap between a portion of the frame and a side surface of the engine.

2. The motorcycle of claim 1, further comprising a thermostat measuring the temperature of the engine, wherein the engine cooling fan is interconnected with and activated by the thermostat to create the flow of cooling air in response to the temperature of the engine exceeding a threshold temperature.

3. The motorcycle claim 1, further comprising a thermostat measuring the temperature of the engine, wherein the engine cooling fan is operable at first and second speeds, the engine cooling fan being interconnected with and activated by the thermostat, the engine cooling fan creating the flow of cooling air at the first speed in response to the engine temperature being within a first range of temperatures and at the second, faster speed in response to the engine temperature being within a second higher range of temperatures.

4. The motorcycle of claim 1, wherein the engine cooling fan is operable after the engine has shut down, the motorcycle further comprising a thermostat measuring the temperature of the engine, the thermostat being interconnected with the engine cooling fan and to deactivate the engine cooling fan when the temperature of the engine falls below a threshold temperature.

5. The motorcycle of claim 1, wherein the engine cooling fan is positioned rearwardly of the engine.

6. The motorcycle of claim 1, wherein the frame includes an integral fan support portion, and wherein the engine cooling fan is mounted to the integral fan support portion.

7. The motorcycle of claim 1, further comprising a cooling air duct that substantially encloses a portion of the engine, the engine cooling fan being in communication with the cooling air duct such that the flow of cooling air is moved through the cooling air duct and across the portion of the engine to cool the engine.

8. The motorcycle of claim 7, further comprising an air scoop positioned at the front portion of the frame and in communication with the cooling air duct to supply air to the cooling air duct, and wherein the engine cooling fan is positioned at the rear portion of the frame.

9. The motorcycle of claim 8, wherein the frame includes a left portion that partially covers the left side surfaces of the engine and a right portion that partially covers the right side surfaces of the engine, and wherein the cooling air duct is partially defined by the left and right portions of the frame.

10. The motorcycle of claim 9, wherein the shroud is a left shroud that substantially seals the gap between the left portion of frame and the left side surfaces of the engine.

11. The motorcycle of claim 10, wherein the air scoop includes a shrouding portion that substantially seals the gap between the right portion of the frame and the right side surfaces of the engine.

12. The motorcycle of claim 9, further comprising an air box mounted to the frame above the engine, wherein the air box partially defines the cooling air duct.

13. A motorcycle comprising:

a frame having a longitudinal axis;

a steering assembly mounted to a front portion of the frame and pivotable with respect to the frame to steer the motorcycle;

a front wheel rotatably mounted to the steering assembly and supporting a front portion of the motorcycle;

a rear wheel rotatably interconnected with a rear portion of the frame and supporting a rear portion of the motorcycle;

an engine/transmission assembly including an engine and a transmission interconnected with each other and supported by the frame, the transmission being interconnected with the rear wheel and operative in response to operation of the engine to drive rotation of the rear wheel;

an air box mounted to the frame, the air box including an air filter, an inlet located outside of the filter and an outlet located inside of the filter such that air entering the inlet passes through the filter before exiting through the outlet; and an air box delivery system that provides air to the air box, the air box delivery system including a passage that is substantially perpendicular to the longitudinal axis and that is in fluid flow communication with the air box, the passage directing the flow of air upwardly into the air box.

14. The motorcycle of claim 13, further comprising a substantially horizontal air scoop that is in fluid flow communication with the passage, the air being partially directed to the passage and partially directed to the engine to cool the engine.

15. The motorcycle of claim 13, wherein the passage extends upwardly through.

16. The motorcycle of claim 13, wherein the passage includes a removable sleeve.

17. The motorcycle of claim 13, wherein the passage includes a bottom portion, wherein the bottom portion is angled upwardly relative to a horizontal axis.

18. The motorcycle of claim 13, further comprising an air manifold that is fluid flow communication with the outlet of the air box, wherein the outlet directs the air downwardly into the air manifold.

19. A motorcycle comprising:

a frame;

a steering assembly mounted to a front portion of the frame and pivotable with respect to the frame to steer the motorcycle;

a front wheel rotatably mounted to the steering assembly and supporting a front portion of the motorcycle;

a rear wheel rotatably interconnected with a rear portion of the frame and supporting a rear portion of the motorcycle;

an engine/transmission assembly including an air-cooled engine and a transmission interconnected with each other and supported by the frame, the transmission being interconnected with the rear wheel and operative in response to operation of the engine to drive rotation of the rear wheel;

an engine cooling fan creating a flow of cooling air across the engine; and a thermostat measuring the temperature of the engine, wherein the engine cooling fan is operable at first and second speeds, the engine cooling fan being interconnected with and activated by the thermostat, the engine cooling fan creating the flow of cooling air at the first speed in response to the engine temperature being within a first range of temperatures and at the second, faster speed in response to the engine temperature being within a second higher range of temperatures.

20. A motorcycle comprising:

a frame;

a steering assembly mounted to a front portion of the frame and pivotable with respect to the frame to steer the motorcycle;

a front wheel rotatably mounted to the steering assembly and supporting a front portion of the motorcycle;

a rear wheel rotatably interconnected with a rear portion of the frame and supporting a rear portion of the motorcycle;

an engine/transmission assembly including an air-cooled engine and a transmission interconnected with each other and supported by the frame, the transmission being interconnected with the rear wheel and operative in response to operation of the engine to drive rotation of the rear wheel;

an engine cooling fan creating a flow of cooling air across the engine;

a cooling air duct that substantially encloses a portion of the engine, the engine cooling fan being in communication with the cooling air duct such that the flow of cooling air is moved through the cooling air duct and across the portion of the engine to cool the engine, wherein the frame includes a left portion that partially covers the left side surfaces of the engine and a right portion that partially covers the right side surfaces of the engine, and wherein the cooling air duct is partially defined by the left and right portions of the frame; and an air box mounted to the frame above the engine, wherein the air box partially defines the cooling air duct.

* * * * *

UNITED STATES PATENT AND TRADEMARK OFFICE
CERTIFICATE OF CORRECTION

PATENT NO.     : 6,601,667 B2                                          Page 1 of 1
DATED          : August 5, 2003
INVENTOR(S)    : Erik F. Buell and Todd R. Wightman It is certified that error appears in the above-identified patent and that said Letters Patent is hereby corrected as shown below:

<u>Column 6,</u>
Line 35, after "through" insert -- the frame --.

Signed and Sealed this

Second Day of December, 2003

JAMES E. ROGAN
*Director of the United States Patent and Trademark Office*